US011942045B2

(12) United States Patent
Ha et al.

(10) Patent No.: US 11,942,045 B2
(45) Date of Patent: Mar. 26, 2024

(54) DISPLAY DEVICE AND METHOD OF DRIVING DISPLAY DEVICE

(71) Applicant: SAMSUNG DISPLAY CO., LTD., Yongin-si (KR)

(72) Inventors: Tae Seok Ha, Hwaseong-si (KR); Koung Soo Kim, Suwon-si (KR); Kyu Jin Park, Cheonan-si (KR); Sung Jae Park, Seongnam-si (KR); Seung Woon Shin, Asan-si (KR); Woon Rok Jang, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/493,240

(22) Filed: Oct. 4, 2021

(65) Prior Publication Data

US 2022/0122550 A1 Apr. 21, 2022

(30) Foreign Application Priority Data

Oct. 19, 2020 (KR) ........................ 10-2020-0135532

(51) Int. Cl.
*G09G 3/3291* (2016.01)

(52) U.S. Cl.
CPC ... *G09G 3/3291* (2013.01); *G09G 2300/0842* (2013.01); *G09G 2310/061* (2013.01); *G09G 2310/08* (2013.01); *G09G 2330/028* (2013.01)

(58) Field of Classification Search
CPC .. G09G 3/3233; G09G 3/3266; G09G 3/3208; G09G 3/3258; G09G 2300/0819; G09G 2300/0842; G09G 2300/0861; G09G 2300/0852; G09G 2300/0426; G09G 2320/0233; G09G 2320/0295; G09G 2320/043; G09G 2320/0247; G09G 2320/045; G09G 2310/08; G09G 2310/0262; G09G 2310/0251; G09G 2340/0435
See application file for complete search history.

(56) References Cited

U.S. PATENT DOCUMENTS

| | | | | |
|---|---|---|---|---|
| 2010/0171733 A1* | 7/2010 | Kobayashi | G09G 3/3208 | 345/211 |
| 2013/0002641 A1* | 1/2013 | Kim | G09G 3/3685 | 345/212 |
| 2017/0249892 A1* | 8/2017 | Jo | G09G 3/2092 | |
| 2019/0180695 A1 | 6/2019 | Ha et al. | | |

(Continued)

FOREIGN PATENT DOCUMENTS

| | | |
|---|---|---|
| KR | 10-2017-0026762 | 3/2017 |
| KR | 10-2018-0114567 | 10/2018 |

(Continued)

*Primary Examiner* — Dong Hui Liang
(74) *Attorney, Agent, or Firm* — F. Chau & Associates, LLC

(57) ABSTRACT

A display device includes a display panel including a plurality of pixels, a data driver configured to provide data voltages to the pixels, and a gate driver configured to provide gate signals to the pixels. The display device also includes a controller configured to control the data driver and the gate driver, and to control the magnitude of a sensing initialization voltage applied to the pixels based on a frame rate value when operating in a variable frame mode.

16 Claims, 7 Drawing Sheets

(56) References Cited

U.S. PATENT DOCUMENTS

| | | | | |
|---|---|---|---|---|
| 2019/0206348 | A1* | 7/2019 | Ahn | G09G 3/3614 |
| 2020/0105177 | A1* | 4/2020 | Choi | G09G 3/20 |
| 2020/0160795 | A1* | 5/2020 | Heo | G09G 3/3233 |
| 2020/0226978 | A1* | 7/2020 | Lin | G09G 3/3258 |
| 2020/0312270 | A1* | 10/2020 | Rao | G09G 5/006 |
| 2022/0014649 | A1* | 1/2022 | Lin | G09G 5/12 |
| 2022/0051630 | A1* | 2/2022 | Shen | G09G 3/3275 |
| 2022/0059030 | A1* | 2/2022 | Sang | G09G 3/3233 |

FOREIGN PATENT DOCUMENTS

| | | |
|---|---|---|
| KR | 10-2019-0138718 | 12/2019 |
| KR | 10-2019-0142791 | 12/2019 |

* cited by examiner

DISPLAY DEVICE AND METHOD OF DRIVING DISPLAY DEVICE

CROSS-REFERENCE TO RELATED APPLICATIONS

This application claims priority under 35 USC § 119 to Korean Patent Application No. 10-2020-0135532, filed on Oct. 19, 2020, in the Korean Intellectual Property Office KIPO, the entire disclosure of which is incorporated by reference herein.

BACKGROUND

1. Field

One or more embodiments described herein relate to a display device a method of driving a display device.

2. Description of the Related Art

A display device may display (or refresh) an image at a constant frame rate of 60 Hz or higher. However, the rendering frame rate of a host processor providing frame data may not match the refresh frame rate of the display device. This mismatch may adversely affect performance in many ways. For example, frame mismatch may cause a tearing phenomenon (e.g., a boundary line to appear) in the displayed image which may intensify, for example, when the frame data corresponds to a game image which requires complex rendering.

One attempt to prevent this tearing phenomenon involves performing a variable frame mode (e.g., a Free-Sync mode or a G-Sync mode). In this mode, the host processor varies a blank period every frame (e.g., on a frame-by-frame basis), which, in turn, causes the frame data to be provided to the display device at a variable frame rate. The display device then displays (or refreshes) an image in synchronization with the variable frame rate.

However, this approach has proven to be insufficient. For example, when operating in a high frequency range (e.g., at a high frame rate), luminance may be reduced and image quality may deteriorate due to a leakage current, LED ON SLEW, or other effects in the blank period. These effects may be exacerbated when a low-grayscale image is displayed on a display panel.

SUMMARY

One or more embodiments of the inventive concept provide a display device capable of improving image quality in a variable frame mode.

One or more embodiments of the inventive concept provide a method of driving a display device, which is capable of improving image quality in a variable frame mode.

In accordance with one or more embodiments, a display device includes a display panel including a plurality of pixels, a data driver configured to provide data voltages to the pixels, a gate driver configured to provide gate signals to the pixels, and a controller configured to control the data driver and the gate driver. The controller is configured to control a magnitude of a sensing initialization voltage applied to the pixels based on a frame rate value when operating in a variable frame mode.

In accordance with one or more embodiments, a method of driving a display device includes determining whether to operate in a variable frame mode, controlling a magnitude of a sensing initialization voltage applied to pixels based on a frame rate value when operating in the variable frame mode, and displaying an image based on the sensing initialization voltage.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Figure 1:
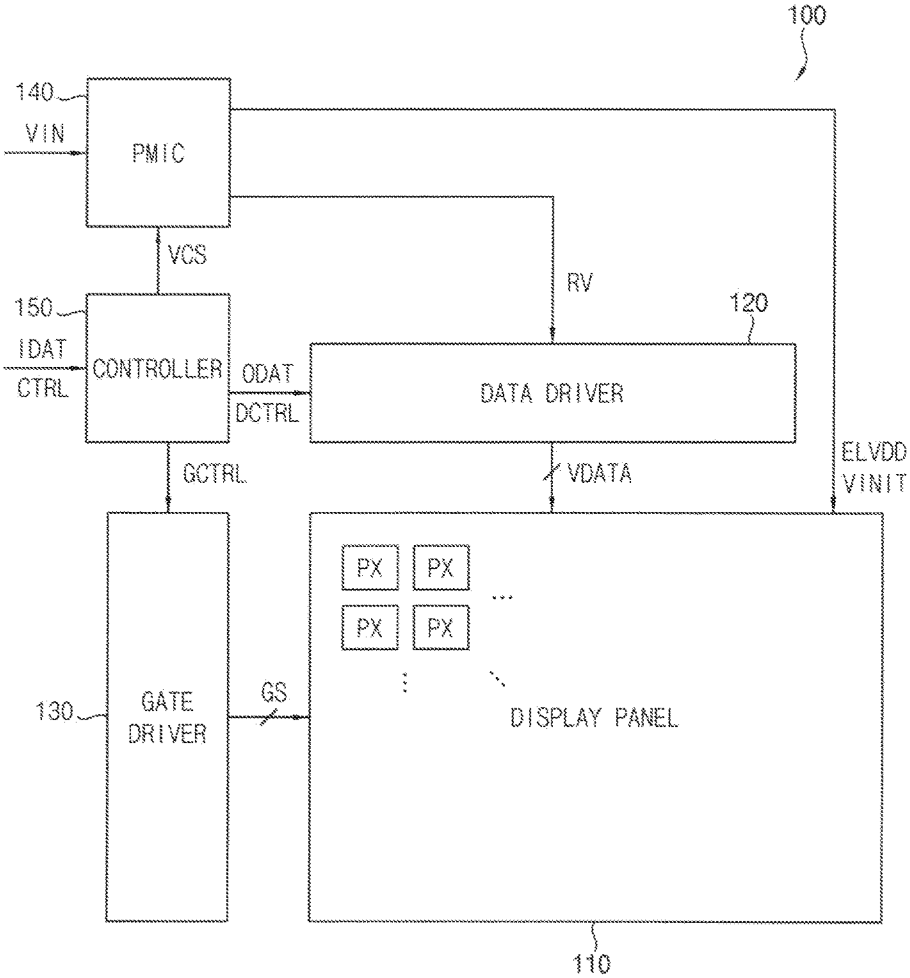
FIG. 1 illustrates an embodiment of a display device.

Hereinafter, embodiments of the present inventive concept will be described in more detail with reference to the accompanying drawings. Like reference numerals will be used for like elements in the drawings, and redundant descriptions of like elements will be omitted.

Figure 2:
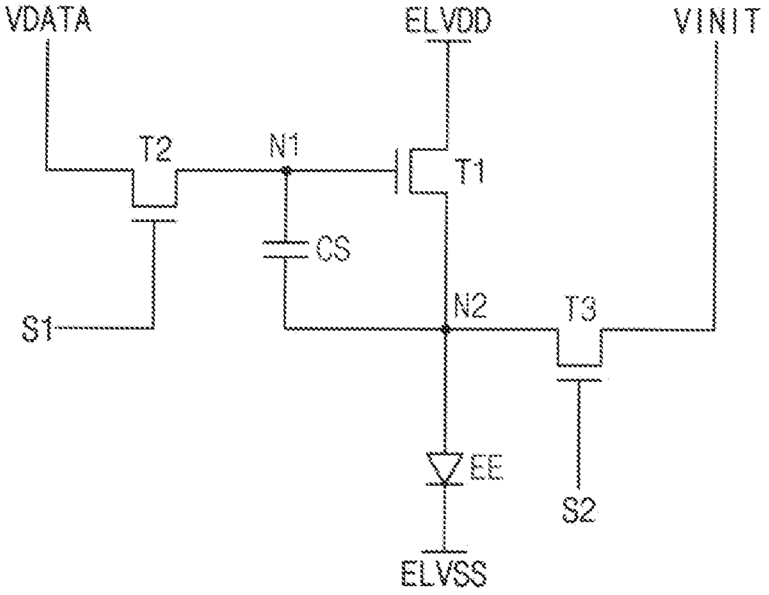
FIG. 2 illustrates an embodiment of a pixel.
Figure 3:
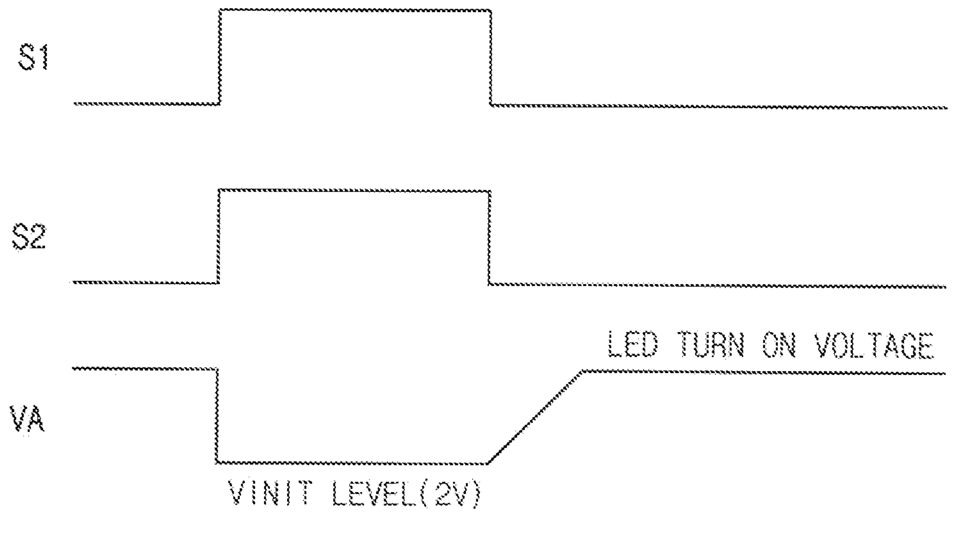
FIG. 3 illustrating an embodiment of signals for controlling the pixel.
Figure 4:
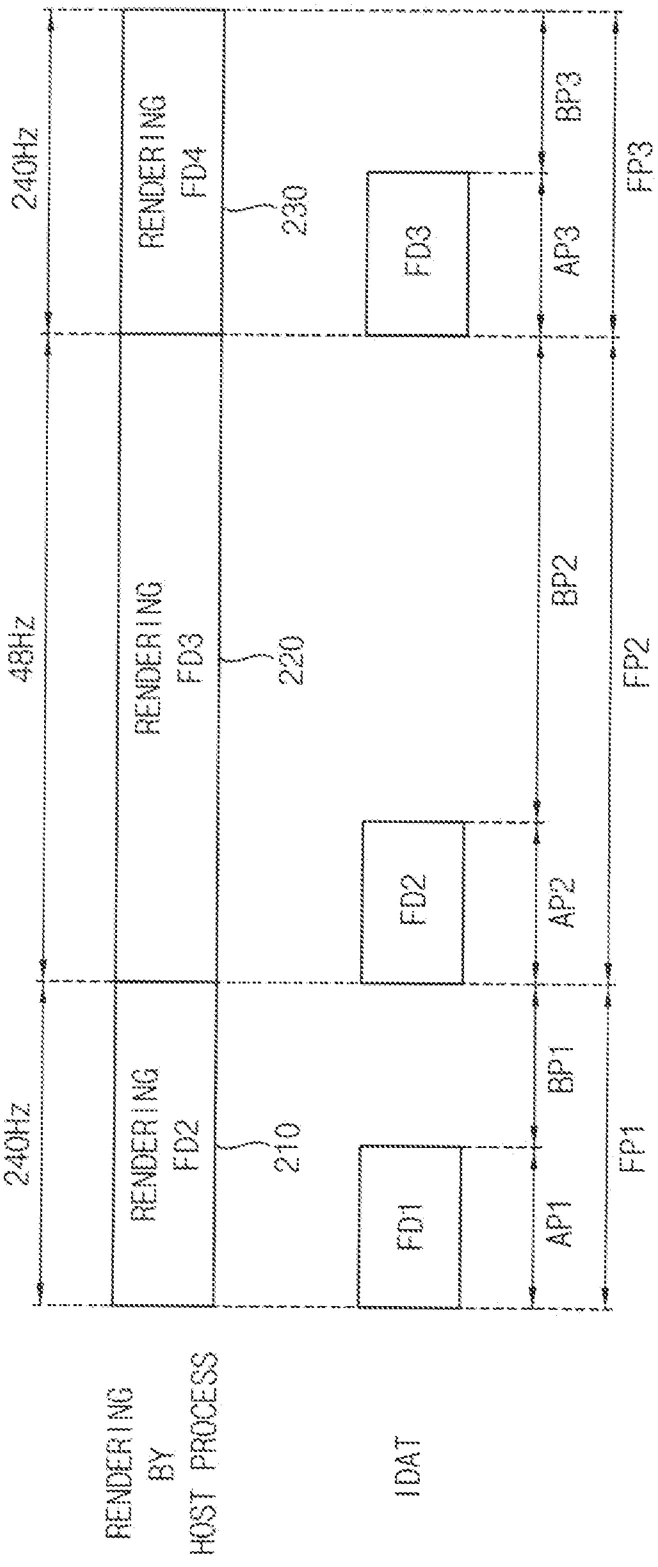
FIG. 4 illustrates an example of frame data provided for a variable frame mode.

FIG. 1 is a block diagram illustrating a display device 100 according to embodiments of the present inventive concept, FIG. 2 is a circuit diagram illustrating a pixel of FIG. 1 according to an embodiment, FIG. 3 is a timing diagram illustrating an input signal and an output signal of the pixel of FIG. 2 according to an embodiment, and FIG. 4 is a diagram illustrating an example of frame data that may be input to the display device 100 in a variable frame mode.

Referring to FIG. 1, the display device 100 may include a display panel 110 including a plurality of pixels PX, a data driver 120 configured to provide data voltages VDATA to the pixels PX, a gate driver 130 configured to provide gate signals GS to the pixels PX, and a power supply voltage generation circuit 140 configured to generate display panel driving voltages RV, VINIT, and ELVDD. The display device 100 may also include a controller 150 configured to control the data driver 120, the gate driver 130, and the power supply voltage generation circuit 140.

The display panel 110 may include a plurality of data lines and a plurality of gate lines connected to the pixels PX. In one embodiment, each of the pixels PX may include a switching transistor and a capacitor connected to the switching transistor.

The data driver 120 may generate the data voltages VDATA based on image data ODAT and a data control signal DCTRL output from the controller 150. The data voltages VDATA may be provided to the pixels PX. The data control signal DCTRL may include, for example, an output data enable signal, a horizontal start signal, and a load signal, but is not limited thereto. The data driver 120 may receive a reference voltage RV (e.g., a gamma reference voltage) from the power supply voltage generation circuit 140. The data voltage VDATA may be generated based on the reference voltage RV. In one embodiment, the data driver 120 may be implemented with at least one data integrated circuit (IC). In some embodiments, the data driver 120 may be directly mounted on the display panel 110 or may be connected to the display panel 110 in the form of a tape carrier package (TCP). In one embodiment, the data driver 120 may be integrated in a peripheral area of display panel 110.

The gate driver 130 may generate the gate signals GS based on a gate control signal GCTRL output from the controller 150, and may provide the gate signals GS to the pixels PX. In one embodiment, the gate control signal GCTRL may include a frame start signal and a gate clock signal, but is not limited thereto. In one embodiment, the gate driver 130 may be implemented as an amorphous silicon gate (ASG) driver integrated in the peripheral area of the display panel 110. In one embodiment, the gate driver 130 may be implemented with at least one gate IC. In some embodiments, the gate driver 130 may be directly mounted on the display panel 110 or may be connected to the display panel 110 in the form of a TCP.

The power supply voltage generation circuit 140 may generate the reference voltage RV to be provided to the data driver 120. For example, the power supply voltage generation circuit 140 may receive an input voltage VIN from an external power source, generate the reference voltage RV based on the input voltage VIN, and provide the reference voltage RV to the data driver 120. The data driver 120 may generate the data voltages VDATA based on the reference voltage RV provided from the power supply voltage generation circuit 140. For example, the data driver 120 may generate grayscale voltages (e.g., 256 grayscale voltages) corresponding to a range of gray levels (e.g., 0-gray level to 255-gray level) based on the reference voltage RV, respectively. The grayscale voltages, which correspond to gray levels represented by the image data ODAT output from the controller 150, may be provided to the pixels PX as the data voltages VDATA.

In one embodiment, the reference voltage RV may include a positive reference voltage and a negative reference voltage. The data driver 120 may provide positive data voltages VDATA to the pixels PX based on the positive reference voltage and may provide negative data voltages VDATA to the pixels PX based on the negative reference voltage.

The power supply voltage generation circuit 140 may provide a sensing initialization voltage VINIT and a first power supply voltage ELVDD to the pixels PX. In one embodiment, the power supply voltage generation circuit 140 may additionally generate an analog driving voltage supplied to the data driver 120 and/or the controller 150, a common voltage supplied to the display panel 110, a gate driving voltage (e.g., a first (e.g., high) gate voltage and a second (e.g., low) gate voltage) supplied to the gate driver 130, and/or other voltages based on the input voltage VIN. In one embodiment, the power supply voltage generation circuit 140 may be implemented as a power management integrated circuit (PMIC) disposed on a control board on which the controller 150 is disposed.

The controller 150 (e.g., a timing controller (T-CON)) may receive input image data IDAT and a control signal CTRL from an external host processor (e.g., a graphic processing unit (GPU) or a graphic card). In one embodiment, the input image data IDAT may be RGB data including red image data, green image data, and blue image data. In one embodiment, the control signal CTRL may include a vertical synchronization signal, a horizontal synchronization signal, an input data enable signal, a master clock signal, and the like, but is not limited thereto.

The controller 150 may generate the gate control signal GCTRL, the data control signal DCTRL, and the output image data ODAT based on the input image data IDAT and the control signal CTRL. The controller 150 may provide the data control signal DCTRL and output image data ODAT to the data driver 120 to control an operation of the data driver 120, and may provide the gate control signal GCTRL to the gate driver 130 to control an operation of the gate driver 130.

According to the embodiments of the inventive concept, the host processor may vary a blank period each frame period to provide the input image data IDAT to the display device 100 at a variable frame rate, and the controller 150 may provide the output image data ODAT to the data driver 120 in synchronization with the variable frame rate. Thus, the controller 150 may support a variable frame mode in which an image is displayed (or refreshed) at the variable frame rate. Such a variable frame mode may be referred to, for example, as a Free-Sync mode, a G-Sync mode.

As shown in FIG. 4, for example, the period or frequency of rendering operations 210, 220, and 230 of the host processor (e.g., the GPU or graphics card) may not be constant (especially when rendering game image data). The host processor may provide the input image data IDAT (e.g., frame data FD1, FD2, and FD3) to the organic light emitting diode display device 100 in synchronization with such an variable period or frequency of the rendering operations 210, 220, and 230 in the variable frame mode. For example, in the variable frame mode, while frames FP1, FP2, and FP3 have constant active periods AP1, AP2, and AP3 with a constant time, respectively, the host processor may vary the time of each of variable blank periods BP1, BP2, and BP3 of the frames FP1, FP2, and FP3 to provide the frame data FD1, FD2, and FD3 to the organic light emitting diode display device 100 at the variable frame rate.

In a first frame FP1, when second frame data FD2 is rendered (210) at a frequency of approximately 240 Hz, the host processor may provide first frame data FD1 to the organic light emitting diode display device 100 at a frame rate of approximately 240 Hz. In addition, the host processor may output the second frame data FD2 during an active period AP2 of a second frame FP2 and may sustain a variable blank period BP2 of the second frame FP2 until the rendering operation 220 for third frame data FD3 is completed. Therefore, in the second frame FP2, when the third frame data FD3 is rendered (220) at a frequency of approximately 48 Hz, the host processor may provide the second frame data FD2 to the organic light emitting diode display device 100 at a frame rate of approximately 48 Hz by increasing a time of the variable blank period BP2 of the second frame FP2. In a third frame FP3, when fourth frame data FD4 is rendered (230) at the frequency of approximately 240 Hz, the host processor may provide the third frame data FD3 to the organic light emitting diode display device 100 at the frame rate of approximately 240 Hz.

As described above, in the variable frame mode, each of the frames FP1, FP2, and FP3 may include constant active periods AP1, AP2, and AP3 (having a constant time regardless of the variable frame rate) and variable blank periods BP1, BP2, and BP3 having a variable time corresponding to the variable frame rate. For example, in the variable frame mode, as the frame rate decreases, the time of each of the variable blank periods BP1, BP2, and BP3 may be increased. In the variable frame mode, the controller 150 may output the input image data IDAT (which is received at the variable frame rate) to the data driver 120 as the output image data ODAT at the variable frame rate. Accordingly, the organic light emitting diode display device 100 for supporting the variable frame mode displays the image in synchronization with the variable frame rate. As a result, a tearing phenomenon caused by frame rate mismatch may be reduced or prevented.

Referring to FIGS. 1 to 3, the pixel PX may include a first thin film transistor T1, a second thin film transistor T2, a third thin film transistor T3, and a storage capacitor CS. The first thin film transistor T1 may be configured to apply the first power supply voltage ELVDD to a second node N2 in response to a signal of a first node N1. The second thin film transistor T2 may be configured to output the data voltage VDATA to the first node N1 in response to a first signal S1. The third thin film transistor T3 may be configured to output a signal of the second node N2 to a sensing node in response to a second signal S2. The storage capacitor CS may include a first end connected to the first node N1 and a second end connected to the second node N2. In addition, the pixel PX may include a light emitting element EE including a first electrode (an anode electrode) connected to the second node N2 and a second electrode to which a second power supply voltage ELVSS is applied. In one embodiment, the second power supply voltage ELVSS may be less than the first power supply voltage ELVDD. The light emitting element EE may be, for example, an organic light emitting diode.

In a sensing initialization operation, the second signal S2 may be activated, so that the sensing initialization voltage VINIT may be applied to the second node N2.

As shown in FIG. 3, in a sensing mode, the first signal S1 may be activated, so that the data voltage VDATA may be applied to the first node N1 through the second thin film transistor T2. In this case, the data voltage VDATA may be a sensing data voltage for sensing a threshold voltage of the first thin film transistor T1.

The first thin film transistor T1 may be turned on by the sensing data voltage applied to the first node in the sensing mode and the sensing initialization voltage VINIT applied to the second node in the sensing initialization operation.

Because the second signal S2 is also activated in the sensing mode, the third thin film transistor T3 may be turned on, and the signal of the second node N2 may be output to the sensing node through the third thin film transistor T3.

An analog-to-digital converter may be disposed at the sensing node, to convert the signal of the second node N2 to a digital sensing signal to sense the threshold voltage of the first thin film transistor T1.

A voltage of the anode electrode of the light emitting element EE may be represented by VA. Before initialization of the light emitting element EE, the voltage VA of the anode electrode of the light emitting element EE may have a level of (ELVSS+VEL) due to the data voltage VDATA of a previous frame. The voltage VEL may refer to a threshold voltage of the light emitting element EE. A capacitance connected in parallel with the light emitting element EE may exist. In the sensing initialization operation, the voltage VA of the anode electrode of the light emitting element EE may be the sensing initialization voltage. In a light emission operation of the light emitting element EE, the voltage VA of the anode electrode of the light emitting element EE may gradually increase.

Because the blank period varies in the variable frame mode, the time length of the blank period may be increased to be greater than the time length of the blank period in a normal mode, in which an image is displayed at a constant frame rate. In the increased blank period, luminance may be reduced, and image quality may deteriorate due to a leakage current.

To prevent a deterioration in image quality due to the leakage current or the like in such a variable blank period, according to the embodiments of the present inventive concept, the controller 150 may control the magnitude of the sensing initialization voltage VINIT applied to the pixels PX based on a frame rate value when operating in the variable frame mode.

For example, when a low-grayscale image is displayed on the display panel 110, a time for charging the parallel capacitance of the light emitting element EE may be relatively slow compared with the case where a middle-grayscale or high-grayscale image is displayed. In one or more embodiments, a low-grayscale image may correspond to a first grayscale image, a middle-grayscale image may correspond to a second grayscale image, and a high-grayscale image may correspond to a third grayscale image.

For example, when the frame rate is increased, the display panel 110 is driven with a low current (e.g., below a predetermined level), so that the parallel capacitance of the light emitting element EE may not be fully charged and the image quality may deteriorate. When the frame rate is increased so that the time for charging the parallel capacitance of the light emitting element EE becomes relatively short, the controller 150 may control the power supply voltage generation circuit 140 to increase the sensing initialization voltage VINIT.

In one embodiment, the controller 150 may provide a voltage control signal VCS that represents a desired voltage level to the power supply voltage generation circuit 140, so as to control the power supply voltage generation circuit 140 to increase the sensing initialization voltage VINIT to the desired voltage level. Accordingly, a reduction in luminance caused by the increase in frame rate may be compensated for by the increase in sensing initialization voltage VINIT.

The controller 150 may vary the reference voltage RV and the first power supply voltage ELVDD in response to the increase in the sensing initialization voltage VINIT. For example, when an image is displayed on the display panel 110 at a high frame rate, the data voltage VDATA applied to each of the pixels PX may be increased as the sensing initialization voltage VINIT increases. As another example, when an image is displayed on the display panel 110 at a high frame rate, the first power supply voltage ELVDD applied to each of the pixels PX may be increased as the sensing initialization voltage VINIT increases.

Hereinafter, operation of display device 100 according to the embodiments of the present inventive concept will be described with reference to FIGS. 1 to 6.

Figure 5:
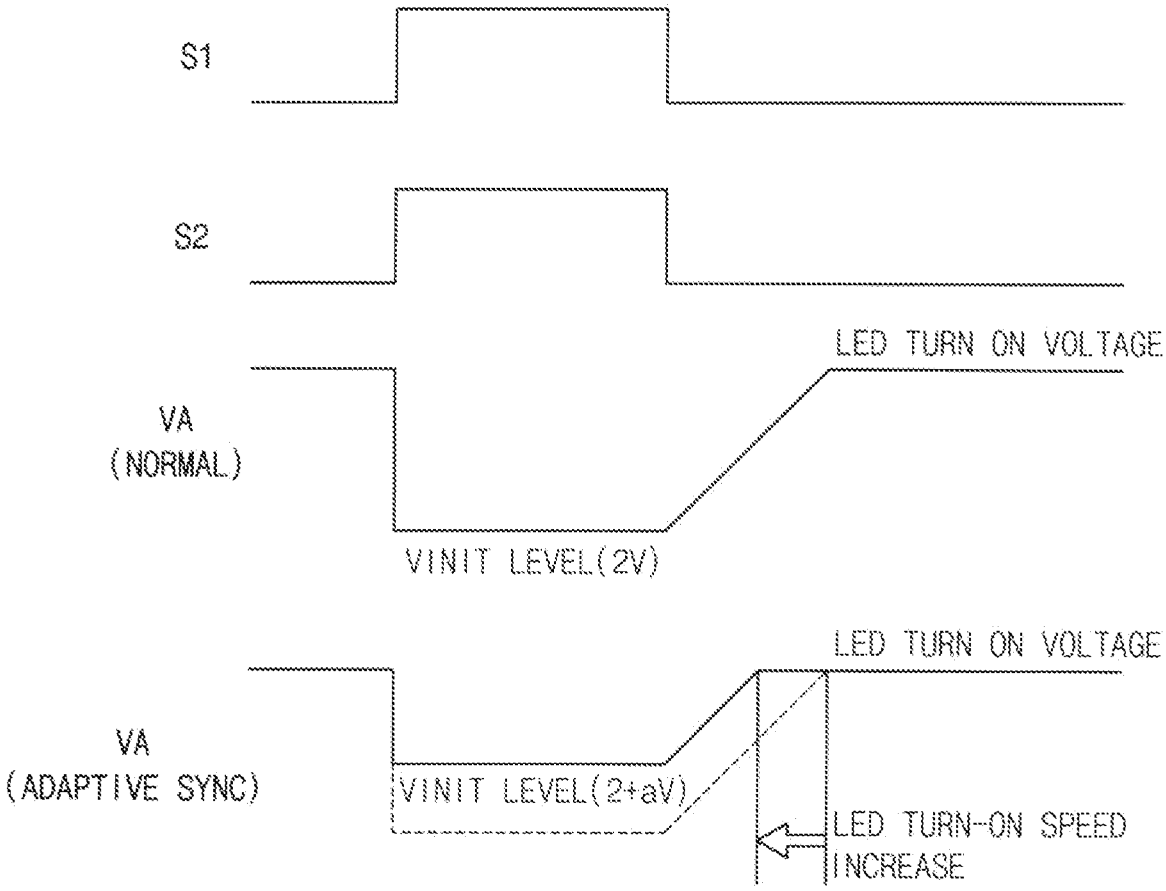
FIG. 5 illustrates an embodiment of signals for controlling a pixel.
Figure 6:
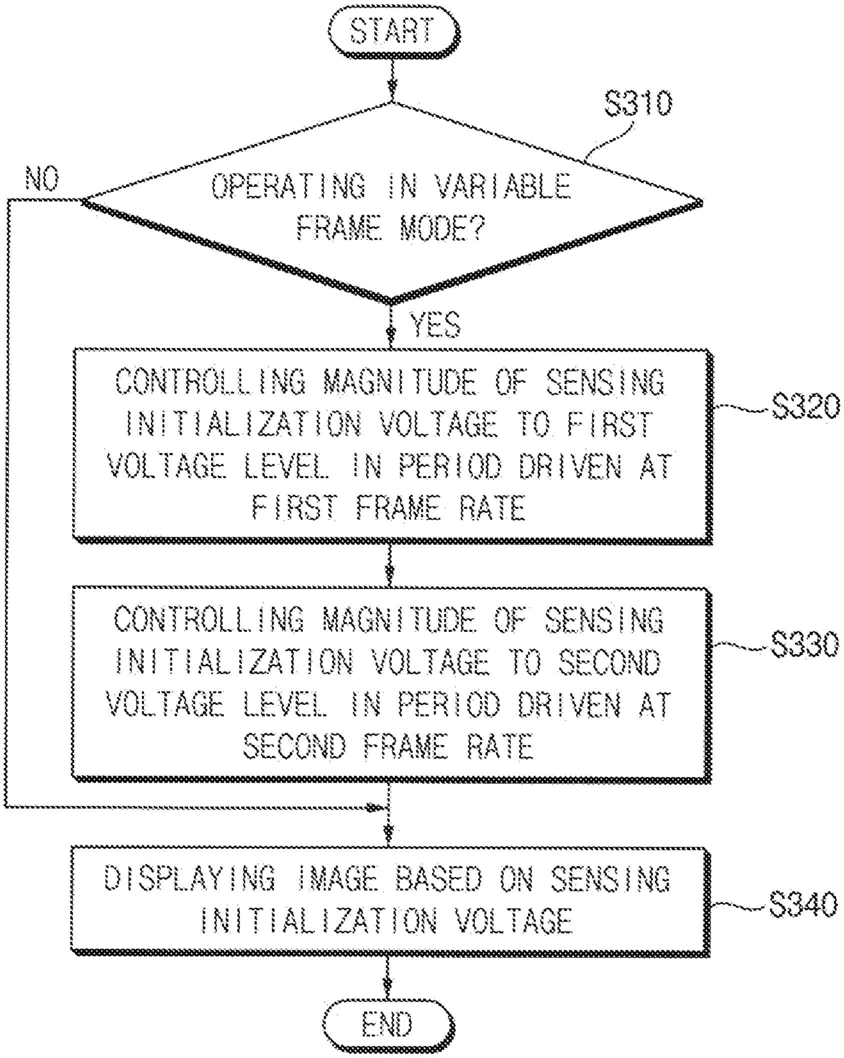
FIG. 6 illustrates an embodiment of a method of driving a display device.

FIG. 5 is a timing diagram illustrating the input signal and the output signal of the pixel PX when a sensing initialization voltage VINIT is controlled according to an embodiment, and FIG. 6 is a flowchart illustrating a method of driving a display device according to one embodiment of the present inventive concept.

Referring to FIGS. 5 and 6, according to the embodiments of the present inventive concept, the display device 100 may determine whether to operate in a variable frame mode (S310), control a magnitude of a sensing initialization voltage applied to pixels based on a frame rate value when operating in the variable frame mode (S320 and S330), and display an image based on the sensing initialization voltage (S340).

In one embodiment, the display device 100 may determine whether to operate in the variable frame mode (S310). In this case, when the display device 100 operates in the variable frame mode, the display device 100 may control the magnitude of the sensing initialization voltage applied to the pixels based on the frame rate value (S320 and S330).

Referring to the voltage VA of the anode electrode of FIG. 5, a controller may not control the sensing initialization voltage VINIT when not operating in the variable frame mode (NORMAL). On the contrary, when operating in the variable frame mode (ADAPTIVE SYNC), the controller 150 may control the sensing initialization voltage VINIT to a first voltage level in a period in which a display panel is driven at a first frame rate (S320). In addition, when operating in the variable frame mode (ADAPTIVE SYNC), the controller 150 may control the sensing initialization voltage VINIT to a second voltage level (e.g., which is higher than the first voltage level) in a period in which the display panel is driven at a second frame rate that is higher than the first frame rate (S330). For example, the controller 150 may provide a voltage control signal VCS that represents a desired voltage level to a power supply voltage generation circuit 140 so as to control the power supply voltage generation circuit 140 to increase the sensing initialization voltage VINIT to the desired voltage level.

In an embodiment, the power supply voltage generation circuit 140 may generate the sensing initialization voltage VINIT and transmit the generated sensing initialization voltage VINIT to the display panel 110. In this case, the controller 150 may provide a first voltage control signal to the power supply voltage generation circuit 140, so as to control the power supply voltage generation circuit 140 to generate the sensing initialization voltage VINIT at the first voltage level (e.g., 2V) in the period in which the display panel 110 is driven at the first frame rate.

In addition, the controller 150 may provide a second voltage control signal to the power supply voltage generation circuit 140, so as to control the power supply voltage generation circuit 140 to generate the sensing initialization voltage VINIT at the second voltage level in the period in which the display panel 110 is driven at the second frame rate. In this case, the second voltage level may be higher than the first voltage level (e.g., 2V). The display panel 110 may display the image by driving the pixels based on the sensing initialization voltage VINIT according to each of the frame rates (S340).

As described above, upon operating in the variable frame mode, when the sensing initialization voltage VINIT applied to the pixel increases in the period in which the display panel 110 is driven at the second frame rate, a capacitance connected in parallel with a light emitting element EE may be rapidly charged. As a result, a reduction in luminance caused by insufficient charging of a voltage VA of an anode electrode may be prevented and image quality may be improved.

Figure 7:
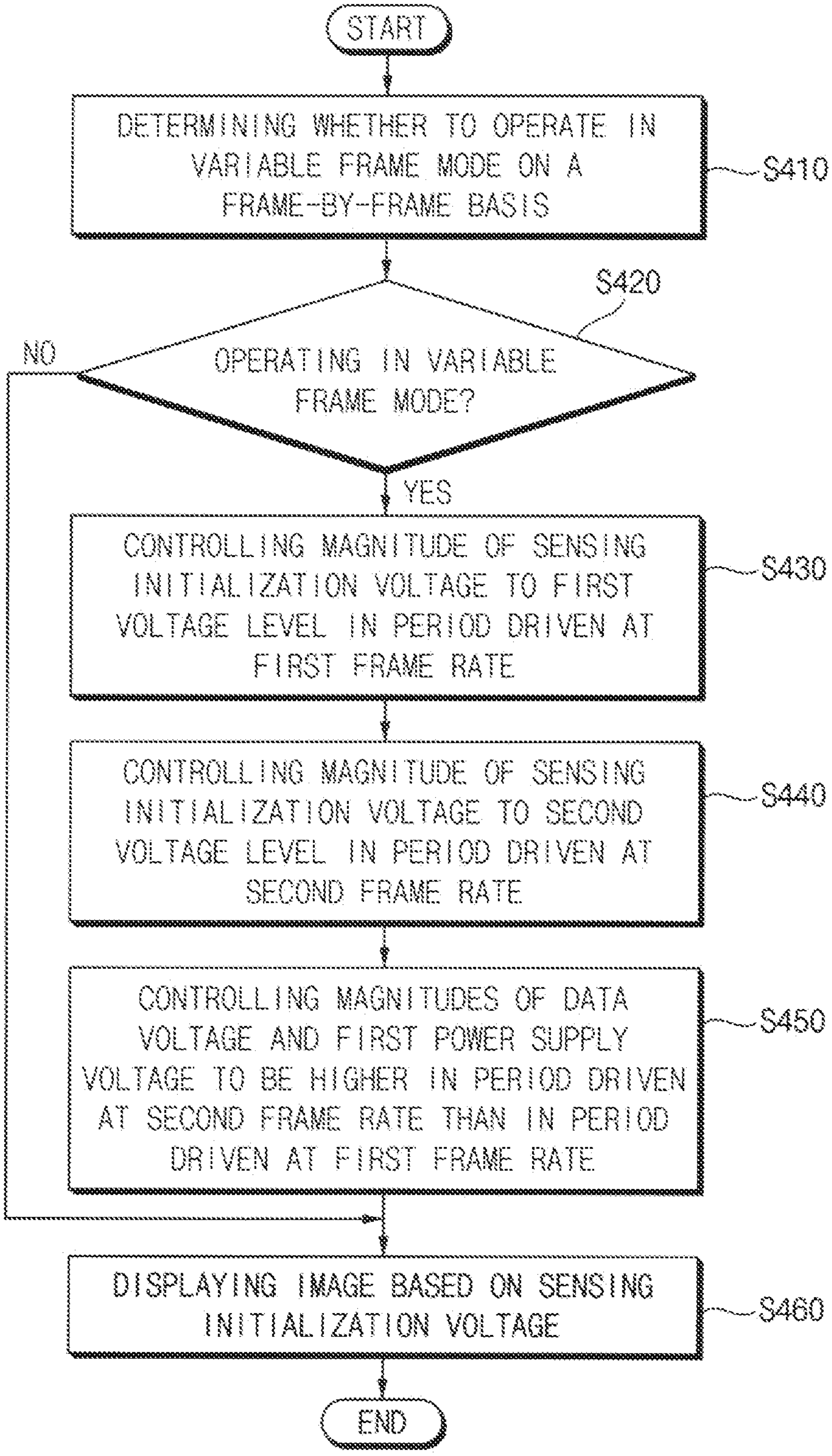
FIG. 7 illustrates an embodiment of a method of driving a display device.

FIG. 7 is a flowchart illustrating a method of driving a display device according to another embodiment of the present inventive concept.

Referring to FIG. 7, according to the embodiments of the present inventive concept, the display device 100 may determine whether to operate in a variable frame mode every frame (e.g., on a frame-by-frame basis) (S410 and S420), control a magnitude of a sensing initialization voltage applied to pixels based on a frame rate value when operating in the variable frame mode (S430 and S440), control magnitudes of a data voltage and a first power supply voltage to be higher in a period in which a display panel 110 is driven at a second frame rate than in a period in which the display panel 110 is driven at a first frame rate (S450), and display an image based on the sensing initialization voltage (S460).

In one embodiment, the display device 100 may determine whether to operate in the variable frame mode every frame (e.g. on a frame-by-frame basis) (S410 and S420). For example, the display device 100 may receive input data from an external device. A controller 150 may determine whether to operate in the variable frame mode every frame (or on a frame-by-frame basis) based on the input data. For example, the controller 150 may include an active time counter configured to generate an active count signal by counting an input clock signal during an active period, and a blank time counter configured to generate a blank count signal by counting the input clock signal during a blank period. In this case, the controller 150 may determine whether to operate in the variable frame mode based on the active count signal and the blank count signal. In one example, the controller 150 may determine whether to operate in the variable frame mode by receiving a variable frame mode start signal through an inter-integrated circuit (I2C) interface. As described above, the controller 150 determines whether to operate in the variable frame mode, so that the controller 150 may determine whether to control the magnitude of the sensing initialization voltage applied to the pixels each frame.

In one embodiment, when the display device 100 operates in the variable frame mode, the display device 100 may control the magnitude of the sensing initialization voltage applied to the pixels based on the frame rate value (S430 and S440).

The controller may not control the sensing initialization voltage VINIT when not operating in the variable frame mode (NORMAL). On the contrary, when operating in the variable frame mode (ADAPTIVE SYNC), the controller 150 may control the sensing initialization voltage VINIT to a first voltage level in the period in which the display panel is driven at the first frame rate (S430). In addition, when operating in the variable frame mode (ADAPTIVE SYNC), the controller 150 may control the sensing initialization voltage VINIT to a second voltage level (e.g., which is higher than the first voltage level) in the period in which the display panel is driven at the second frame rate that is higher than the first frame rate (S440). For example, the controller 150 may provide a voltage control signal VCS that represents a desired voltage level to a power supply voltage generation circuit 140, so as to control the power supply voltage generation circuit 140 to increase the sensing initialization voltage VINIT to the desired voltage level.

The power supply voltage generation circuit 140 may generate the sensing initialization voltage VINIT and transmit the generated sensing initialization voltage VINIT to the display panel 110. In this case, the controller 150 may provide a first voltage control signal to the power supply voltage generation circuit 140, so as to control the power supply voltage generation circuit 140 to generate the sensing initialization voltage VINIT at the first voltage level (e.g., 2V) in the period in which the display panel 110 is driven at the first frame rate. In addition, the controller 150 may provide a second voltage control signal to the power supply voltage generation circuit 140, so as to control the power supply voltage generation circuit 140 to generate the sensing initialization voltage VINIT at the second voltage level in the period in which the display panel 110 is driven at the second frame rate. In this case, the second voltage level may be higher than the first voltage level (e.g., 2V).

In one embodiment, the display device 100 may control the magnitudes of the data voltage and the first power supply voltage to be higher in the period in which the display panel 110 is driven at the second frame rate than in the period in which the display panel 110 is driven at the first frame rate (S450). When an image is displayed on the display panel 110 at a high frame rate, the data voltage VDATA applied to each of the pixels PX may be increased as the sensing initialization voltage VINIT increases. In addition, when an image is displayed on the display panel 110 at a high frame rate, the first power supply voltage ELVDD applied to each of the pixels PX may be increased as the sensing initialization voltage VINIT increases.

The power supply voltage generation circuit 140 may receive the first voltage control signal from the controller 150 to generate a first reference voltage, and receive the second voltage control signal from the controller 150 to generate a second reference voltage that is higher than the first reference voltage. The power supply voltage generation circuit 140 may transmit the first reference voltage and the second reference voltage to the data driver. In this case, the data driver 120 may control the magnitude of the data voltage applied to the pixels based on the first reference voltage and the second reference voltage.

For example, when the display panel 110 is driven at the first frame rate, the data driver 120 may receive the first reference voltage from the power supply voltage generation circuit 140. When the display panel 110 is driven at the second frame rate, the data driver 120 may receive the second reference voltage from the power supply voltage generation circuit 140. In this case, the magnitude of the data voltage generated by the data driver may be greater in the period in which the display panel is driven at the second frame rate than in the period in which the display panel is driven at the first frame rate. For example, when the display panel 110 is driven at the second frame rate so that the sensing initialization voltage VINIT applied to the pixel increases, the data voltage VDATA applied to the pixel may be increased accordingly.

The power supply voltage generation circuit 140 may generate the first power supply voltage ELVDD applied to the pixels. In this case, the power supply voltage generation circuit 140 may receive the first voltage control signal and the second voltage control signal from the controller 150, and control the magnitude of the first power supply voltage ELVDD applied to the pixels based on the first voltage control signal and the second voltage control signal. For example, when the display panel 110 is driven at the first frame rate, the power supply voltage generation circuit 140 may receive the first voltage control signal from the controller 150.

When the display panel 110 is driven at the second frame rate, the power supply voltage generation circuit 140 may receive the second voltage control signal from the controller 150. In this case, the first power supply voltage ELVDD generated by the power supply voltage generation circuit 140 may be higher in the period in which the display panel is driven at the second frame rate than in the period in which the display panel is driven at the first frame rate. For example, when the display panel 110 is driven at the second frame rate so that the sensing initialization voltage VINIT applied to the pixel increases, the first power supply voltage ELVDD applied to the pixel may be increased accordingly. The display panel 110 may display the image by driving the pixels based on the sensing initialization voltage VINIT, the data voltage VDATA, and the first power supply voltage ELVDD according to each of the frame rates (S460).

As described above, when operating in variable frame mode, when the sensing initialization voltage VINIT, the data voltage VDATA, and the first power supply voltage ELVDD applied to the pixel increase in the period in which the display panel 110 is driven at the second frame rate, a capacitance connected in parallel with a light emitting element EE may be rapidly charged. Therefore, according to the display device 100, the reduction in luminance caused by insufficient charging of a voltage VA of an anode electrode may be prevented and image quality may be improved. As a result, according to the display device 100 of the embodiments of the present inventive concept, the reduction in luminance caused by a frame rate variation in the variable frame mode may be prevented.

Figure 8:
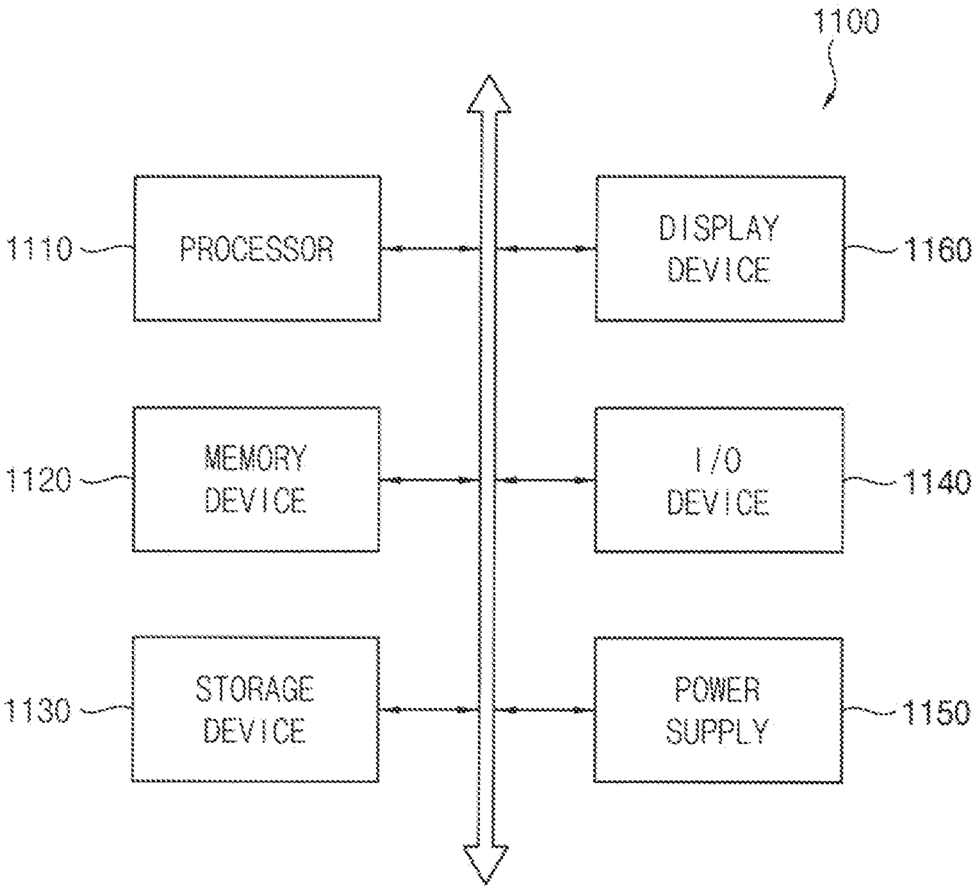
FIG. 8 illustrates an embodiment of an electronic device.

FIG. 8 is a block diagram illustrating an electronic device 1100 including the display device according to the embodiments of the present inventive concept.

Referring to FIG. 8, the electronic device 1100 may include a processor 1110, a memory device 1120, a storage device 1130, an input/output (I/O) device 1140, a power supply 1150, and a display device 1160. The electronic device 1100 may further include a plurality of ports for communicating a video card, a sound card, a memory card, a universal serial bus (USB) device, other electric devices, etc.

The processor 1110 may perform various computing functions or tasks. The processor 1110 may be an application processor (AP), a microprocessor, a central processing unit (CPU), or another type of processor. The processor 1110 may be coupled to other components via an address bus, a control bus, a data bus, etc. Further, in some example embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device (e.g., an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc.) and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In embodiments, the display device 1160 may include a display panel including a plurality of pixels, a data driver configured to provide data voltages to the pixels, a gate driver configured to provide gate signals to the pixels, and a controller configured to control the data driver and the gate driver. The controller is configured to control the magnitude of a sensing initialization voltage applied to the pixels based on a frame rate value when operating in the variable frame mode. According to the display device 1160 of the embodiments of the present inventive concept, when operating in the variable frame mode, the sensing initialization voltage applied to each of the pixels is increased in a frame period driven at a high frame rate so as to shorten a voltage charging time of an anode electrode. As a result, a reduction in luminance caused by insufficient charging of a voltage of the anode electrode can be prevented and the image quality can be improved.

Embodiments of the present inventive concept may be applied to any type of display device supporting a variable frame mode, and any electronic device including such a display device 1160. For example, the present inventive concepts may be applied to a smart phone, a wearable electronic device, a tablet computer, a mobile phone, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, etc.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, modules, units, multiplexers, generators, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, devices, modules, units, multiplexers, generators, logic, interfaces, decoders, drivers, generators and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings of the present inventive concept. Accordingly, such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein. The embodiments may be combined to form additional embodiments.

What is claimed is:

1. A display device, comprising:

a display panel including a plurality of pixels;

a data driver configured to provide data voltages to the pixels;

a gate driver configured to provide gate signals to the pixels;

a power supply voltage generation circuit configured to generate a sensing initialization voltage; and a controller configured to control the data driver and the gate driver, wherein the controller is configured to synchronize a refresh rate of the display panel with a variable frame rate of image data, wherein the controller controls a magnitude of the sensing initialization voltage applied to the pixels based on a frame rate value when operating in a variable frame mode, wherein the controller provides a first voltage control signal and a second voltage control signal to the power supply voltage generation circuit to control the magnitude of the sensing initialization voltage, wherein, when operating in the variable frame mode, the controller is configured to:

control the sensing initialization voltage to a first voltage level in a period in which the display panel is driven at a first frame rate for a frame of the image data having a first frame period, and control the sensing initialization voltage to a second voltage level in a period in which the display panel is driven at a second frame rate for a frame of the image data having a second frame period different from the first frame period, wherein the second voltage level is higher than the first voltage level and wherein the second frame rate is higher than the first frame rate, wherein the power supply voltage generation circuit is configured to generate a first reference voltage and a second reference voltage, wherein the first reference voltage is generated according to the first voltage control signal, wherein the second reference voltage is higher than the first reference voltage and is generated according to the second voltage control signal, and wherein:

the controller is configured to:

provide the first voltage control signal to the power supply voltage veneration circuit to generate the sensing initialization voltage at the first voltage level in the period in which the display panel is driven at the first frame rate, and provide the second voltage control signal to the power supply voltage generation circuit to generate the sensing initialization voltage at the second voltage level in the period in which the display panel is driven at the second frame rate.

2. The display device of claim 1, wherein the controller is configured to determine whether to operate in the variable frame mode on a frame-by-frame basis.

3. The display device of claim 2, wherein the controller includes:

an active time counter configured to generate an active count signal by counting an input clock signal during an active period; and a blank time counter configured to generate a blank count signal by counting the input clock signal during a blank period, and wherein the controller is configured to determine whether to operate in the variable frame mode based on the active count signal and the blank count signal.

4. The display device of claim 2, wherein the controller is configured to determine whether to operate in the variable frame mode based on a variable frame mode start signal received through an inter-integrated circuit (I2C) interface.

5. The display device of claim 1, wherein:

the data driver is configured to control a magnitude of the data voltage applied to the pixels based on the first reference voltage and the second reference voltage.

6. The display device of claim 5, wherein the magnitude of the data voltage is higher in the period in which the display panel is driven at the second frame rate than in the period in which the display panel is driven at the first frame rate.

7. The display device of claim 1, wherein the power supply voltage generation circuit is configured to:

generate a first power supply voltage to be applied to the pixels, and control a magnitude of the first power supply voltage to be applied to the pixels based on the first voltage control signal and the second voltage control signal.

8. The display device of claim 7, wherein the magnitude of the first power supply voltage is higher in the period in which the display panel is driven at the second frame rate than in the period in which the display panel is driven at the first frame rate.

9. A method of driving a display device, the method comprising:

determining whether to operate in a variable frame mode;

synchronizing a refresh rate of the display device with a variable frame rate of image data whet operating in the variable frame mode;

controlling a magnitude of a sensing initialization voltage applied to pixels based on a frame rate value in the variable frame mode;

providing a first voltage control signal from a controller to a power supply voltage generation circuit to control the magnitude of the sensing initialization voltage;

providing a second voltage control signal from the controller to the power supply voltage generation circuit to control the magnitude of the sensing initialization voltage;

generating a first reference voltage according to the first voltage control signal;

generating a second reference voltage according to the second voltage control signal, wherein the second reference voltage is higher than the first reference voltage; and displaying an image based on the sensing initialization voltage, wherein, when operating in the variable frame mode, controlling the magnitude of the sensing initialization voltage includes:

controlling the sensing initialization voltage to a first voltage level in a period in which a display panel is driven at a first frame rate for a frame of the image data having a first frame period, and controlling the sensing initialization voltage to a second voltage level in a period in which the display panel is driven at a second frame rate for a frame of the image data having a second frame period different from the first frame period, wherein the second voltage level is higher than the first voltage level and wherein the second frame rate is higher than the first frame rate, and wherein controlling the magnitude of the sensing initialization voltage includes:

generating the sensing initialization voltage at the first voltage level in the period in which the display panel is driven at the first frame rate, and generating the sensing initialization voltage at the second voltage level in the period in which the display panel is driven at the second frame rate.

10. The method of claim 9, wherein determining whether to operate in the variable frame mode includes determining whether to operate in the variable frame mode on a frame-by-frame basis.

11. The method of claim 10, wherein determining whether to operate in the variable frame mode includes:

generating an active count signal by counting an input clock signal during an active period;

generating a blank count signal by counting the input clock signal during a blank period; and determining whether to operate in the variable frame mode based on the active count signal and the blank count signal.

12. The method of claim 10, wherein determining whether to operate in the variable frame mode includes determining whether to operate in the variable frame mode based on a variable frame mode start signal received through an inter-integrated circuit (I2C) interface.

13. The method of claim 9, further comprising:

controlling a magnitude of a data voltage applied to the pixels based on the first reference voltage and the second reference voltage.

14. The method of claim 13, wherein the magnitude of the data voltage is higher in the period in which the display panel is driven at the second frame rate than in the period in which the display panel is driven at the first frame rate.

15. The method of claim 9, further comprising:

generating a first power supply voltage applied to the pixels; and controlling a magnitude of the first power supply voltage applied to the pixels based on the first voltage control signal and the second voltage control signal.

16. The method of claim 15, wherein the magnitude of the first power supply voltage is higher in the period in which the display panel is driven at the second frame rate than in the period in which the display panel is driven at the first frame rate.

* * * * *